Sept. 5, 1933.     I. L. EASTMAN     1,925,484
SPEED RESPONSIVE CONTROL MEANS
Filed Jan. 17, 1931     2 Sheets-Sheet 1

Inventor
Ivan L. Eastman,
By Owen & Owen,
Attorneys

Sept. 5, 1933.  I. L. EASTMAN  1,925,484
SPEED RESPONSIVE CONTROL MEANS
Filed Jan. 17, 1931   2 Sheets-Sheet 2
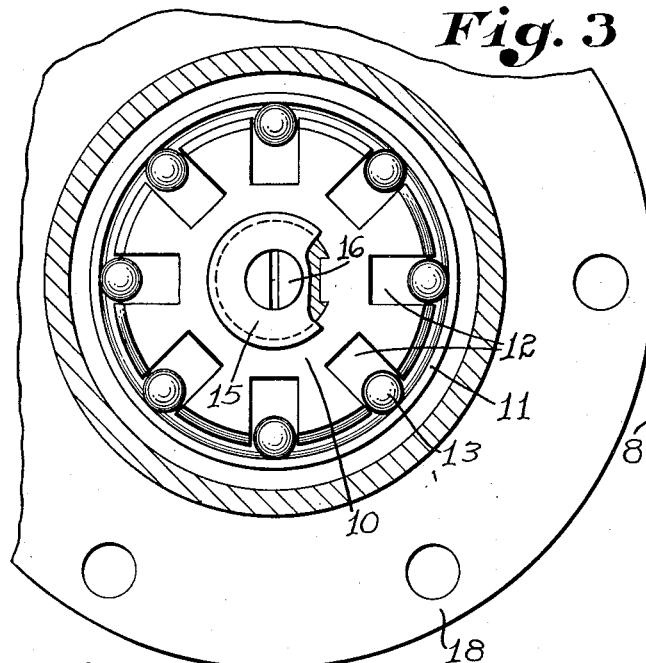
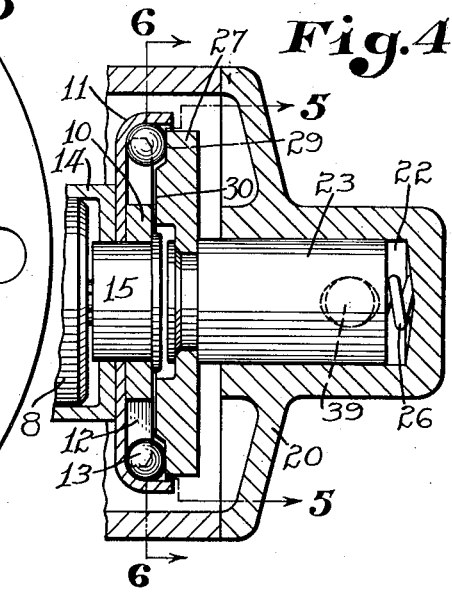
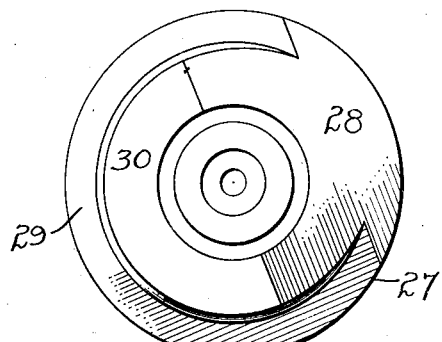
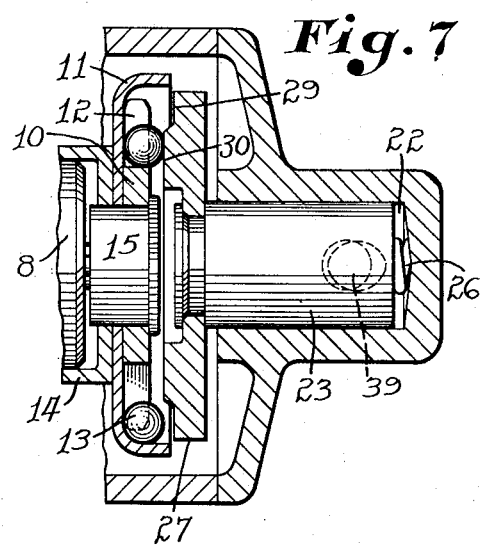
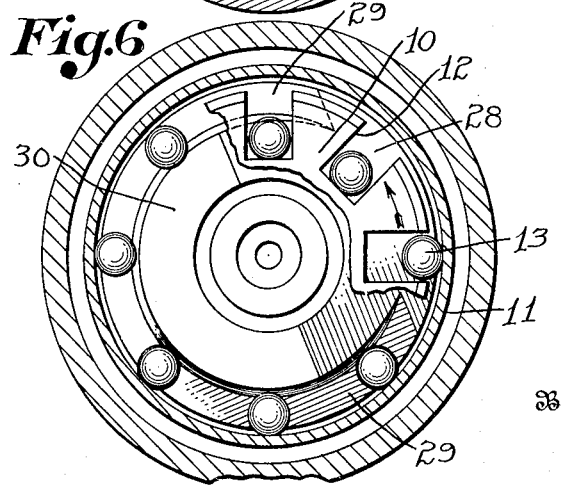
Inventor
Ivan L. Eastman,
By Owen & Owen,
Attorneys.

Patented Sept. 5, 1933

1,925,484

UNITED STATES PATENT OFFICE 1,925,484

SPEED RESPONSIVE CONTROL MEANS

Ivan L. Eastman, Bryan, Ohio, assignor to The De Vilbiss Company, Toledo, Ohio, a corporation of Ohio Application January 17, 1931. Serial No. 509,344

8 Claims. (Cl. 264—17)

This invention relates to speed responsive means primarily intended for use in connection with air compressors, whereby when the speed of the operating motor has dropped a predetermined extent, a relief valve in the compressing line will be opened so that the compressor will be relieved of the compressing load when the motor is starting or retaining a predetermined speed.

The invention is fully described in the following specification, and while in its broader aspect it is capable of embodiment in numerous forms, one embodiment thereof is illustrated in the accompanying drawings, in which—

Figure 1:
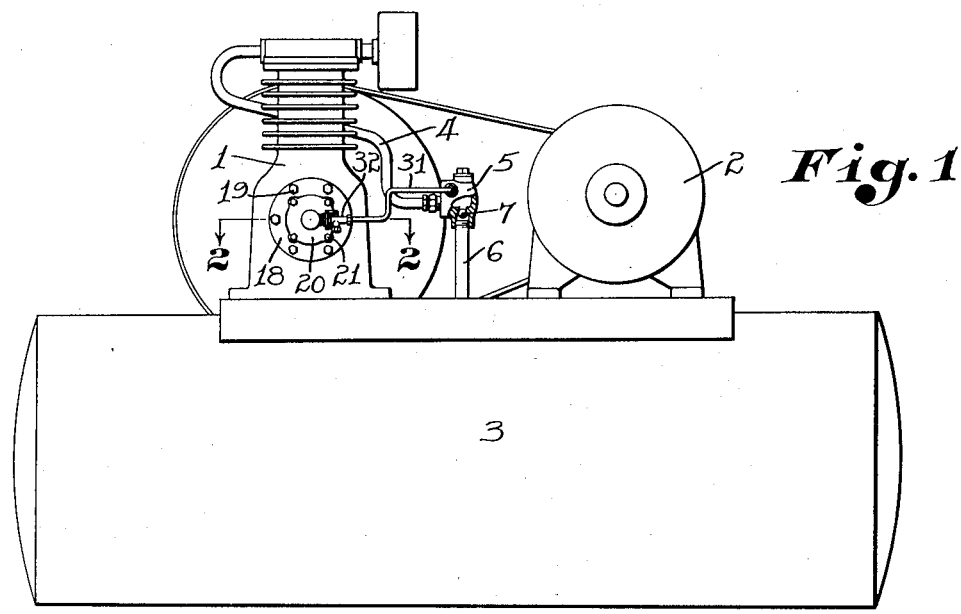
Figure 2:
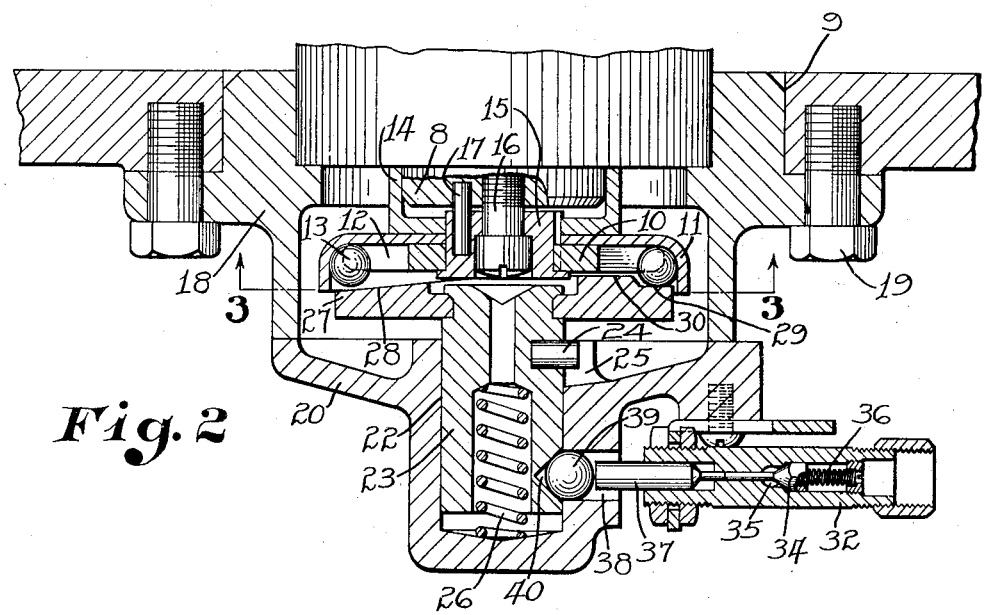

Figure 1 is a side elevation of a compressor embodying the invention, with a part broken away. Fig. 2 is an enlarged section on the line 2—2 in Fig. 1 of the feature embodying the invention, with parts in full, and with the governor parts in the position which they assume when the compressor is running at proper speed. Fig. 3 is a section on the line 3—3 in Fig. 2, with parts broken away. Fig. 4 is a view similar to Fig. 2 except that the section is vertical instead of horizontal. Fig. 5 is a face view of the cam-disk employed. Fig. 6 is a section of the line 6—6 in Fig. 4, with parts broken away, and showing some of the balls moving inward to relief-valve opening position, and Fig. 7 is a section similar to Fig. 4 showing the position of the parts when the compressor is at rest.

Referring to the drawings, 1 designates an air compressor unit driven by motor 2 and adapted to supply air under compression to a storage tank 3. The outlet pipe 4 of the compressor connects, in the present instance, through a coupling head 5 with a pipe 6 leading into the tank 3, and a check-valve 7 is located in the head 5 and adapted to close under back pressure from the tank.

The primary purpose of the present invention is to relieve the pressure in the compressor line at the compressor side of the valve 7 when the compressor stops, so as to relieve the compressor of load while starting and getting up to a proper operating speed.

An end of the compressor crank shaft 8 is exposed through an opening 9 in a side of the compressor casing, and fixed concentrically to this shaft to turn therewith is a ball guiding-disk 10 and a cup-shaped cage 11 disposed at the inner side of the disk and having its cupped edge portion or flange overhanging the disk 10 whereby the disk is entirely disposed therein. The disk 10 is provided around its edge with a plurality of equidistantly spaced radial notches 12, in each of which a ball 13 is mounted and guided for free radial movements, the outward movements of the balls in said notches being limited by the overhanging edge of the cage 11. This cage also coacts with the balls at the inner side of the disk 10 to assist in guiding the radial movements of the balls.

The disk 10 and cage 11 are centered on the shaft end, in the present instance, by a cup member 14, which fits on the shaft, and said disk, cage and member are assembled on a hub member 15, which is secured to the shaft end by a screw 16. A pin 17 engages the shaft and hub member to prevent relative turning thereof.

The disk 10 and cage 11 are enclosed within a shell or casing part 18 that is fitted at its inner side in the casing opening 9 to maintain centered relation to the shaft 8, and is secured to the casing by screws 19. The outer end of the casing part 18 is open to permit access to the enclosed parts and this opening is adapted to be closed by a cap-piece 20 secured thereto by screws 21.

The cap-piece 20 is spaced axially from the disk 10 and has an internal central bearing socket 22 coaxial with the shaft 4 in which a stub-shaft 23 is mounted for axial reciprocatory movements, but prevented from rotation by a pin 24 thereon working in a slot or notch 25 in the bearing wall. A compression spring 26 is disposed between the base of the socket 22 and the adjacent end of the stub-shaft and acts to normally move the shaft inward.

A cam-disk 27 is fixed to the inner end of the stub-shaft 23 adjacent to and at the side of the disk 10 opposed to the cage 11 and cooperates with said cage to retain the balls 13 within the disk notches 12. The side of the cam-disk 27 which faces the disk 10, and which may be termed its "working face", is cut away or chamfered on an incline at one side of its axis, shown at 28, and the peripheral or outer edge portion of such face is recessed to form a ball raceway 29 concentric to the disk axis and open at both ends to the inclined surface 28, as best shown in Fig. 5. The face of the cam-disk is thus provided with an inclined chamfered portion 28, a circular raceway 29, and an elevated portion 30, the latter being disposed within the raceway and at the side of the disk axis opposed to the inclined surface 28. The raceway 29 is in a common diametrical plane throughout its length, and the incline 28 is such that it cuts through such plane so that the outer portion of said inclined surface recedes from said plane to provide a clearance space for the balls 13, as shown in Fig. 2 and as hereinafter described.

It is apparent that when the disk 10 is rotated at a predetermined speed with the compressor shaft, the governor balls 13, acted on by centrifugal force, will move to their outward positions shown in Figs. 2, 3 and 4, and travel around the raceway 29, and across the connecting outer end portion of the cam surface 28, the cam-disk 27 being stationary against rotation.

When the speed of the compressor drops below a predetermined proper compressing speed, the balls 13, as they successively rise from the lower side of the raceway 29 and enter the chambered space 28 of the cam disk 27, will move by gravity to the inner ends of the respective notches 12, as best shown in Fig. 6, into circular register with the raised cam-way 30. Then, as the rotation of the disk 10 continues, each of such inwardly moved balls will be caused to pass up the incline 28 to the protuberant surface 30 and thereby, due to rolling wedging action of the balls and particularly the first ball in order to pass up said incline, effecting an outward movement of the cam-disk 27 and its stub shaft 23 relative to the disk 10 and cage 11, which latter receives the opposed thrusts of the balls 13. The outward movement of the cam-disk 27 and its shaft 23 is opposed by the springs 26 and 36, so that said disk and its shaft normally stand at the inward position of the axial movement, in which position the relief valve 34 is closed. It will be understood that when the shaft 23 is moved outward against the tension of said springs and by the camming coaction of the balls 13 with the protuberant surface 30, the member 39 will be forced outward by camming coaction of the shaft notch 40 therewith and effect an opening of the relief valve 34.

When the compressor is again brought up to speed, the balls, as they successively travel into register with the cut-away portion 28 of the cam-disk, will be freed from the opposed gripping action of the cam surface 30 and cage and will, therefore, move outward into annular register with the raceway 29. When the centrifugal means has turned sufficiently for all of the balls to be released in this manner from wedging coaction with the cam-disk 27, such disk and its shaft 23 will move inward under the action of the spring 26 and 36 to normal position.

For the purpose of relieving the compressions within the compressor-cylinder and associated parts, such for instance, as pipe 4, when the compressor is at rest or is running below proper operating speed, a tube 31 leads, in the present instance from the coupling head 5 at the compressor side of the check-valve 7 to a valve-casing 32, which encloses a valve 34 that normally acts to close an outlet or relief-passage 35 from said tube. The valve 34 is normally held seated by a spring 36. The valve-casing 32 is carried by the cap member 20 at one side of the portion thereof which receives the stub-shaft 23, and the stem 37 of the valve 34 projects from the valve-casing 32 into an opening 38 in a side of the cap piece 20. This opening communicates with the bearing socket in which the stub-shaft 23 works and carries a plunger 39, in the present instance, in the form of a ball, which engages the valve-stem 37 at its outer side and has its inner side resting in a conical or V-shaped socket 40 in a side of the stub-shaft 23. It is thus apparent that when the stub-shaft 23 is moved outward, the ball 39 will be moved outward in the opening 38 by the camming action of the tapered inner side of the notch 40 thereon, and will effect an opening of the relief-valve 34. The part 39, for the purpose of the claims, may be considered as a control element.

The operation of the pressure relief means embodying the invention is as follows: When the compressor is at rest the balls 13, or at least a portion thereof, will be located at the inner ends of the respective notches 12 in the disk 10 and disposed between the protuberant portion 30 of the cam-disk 27 and the cage 11, as shown in Fig. 7, thereby holding the cam-disk 27 and its shaft 23 in the outward or valve-opening positions of their movements. When the shaft 23 is in this position the plunger 39 will be held outward a sufficient extent to maintain the relief-valve 34 open, thus relieving the compressor of any compressing load. This permits an easy starting of the compressor. When the compressor has been brought up to a predetermined operating speed, the governor balls 13 will be moved by centrifugal action to the limit of their outward movements, and continue to travel around the raceway 29 of the cam-disk 27 so long as proper speed is maintained. When the speed of the compressor has, for any reason, been lowered to such an extent that the gravity action of the balls 13 overcomes the centrifugal force acting thereon, the balls, as they move into the clearance space 28, will pass to the inner ends of the notches 12 in which they work and will be caused to traverse the inclined surface 28 to the elevated or protuberant surface 30, thereby effecting by rolling wedging action an outward camming movement of the disk 27, and its shaft 23, which in turn actuates the plunger 39 to open the relief-valve 34.

I wish it understood that my invention is not limited to any specific construction, arrangement or form of the parts, as it is capable of numerous modifications and changes without departing from the spirit of the claims.

Having thus described my invention, what I claim as new and desire to secure by Letters Patent is:

1. In combination, a rotary element, a speed responsive mechanism associated with said rotary element, a control element, said responsive mechanism including rolling members which are radially movable outward by centrifugal force and reciprocally movable means coacting with said control element and normally standing in one position and operable to impart predetermined movement to said control element when moved from such position, said last means being movable from normal position by rolling wedging coaction of said radially movable members therewith when one or more of said members are in the inward position of their radial movements.

2. In combination, a rotatable speed responsive mechanism including rolling members rotatable with said mechanism and being radially movable outward by centrifugal force, cam means mounted for reciprocatory movements axially of said responsive mechanism and normally standing in one position of its movement relative thereto, a control element in connection with and having predetermined movement imparted thereto by movement of said cam means from normal position, the speed responsive members of said responsive mechanism having rolling wedging coaction with said cam member to move it from normal position when the speed of said mechanism drops a predetermined extent.

3. In combination, a shaft, a speed responsive mechanism carried by said shaft and having speed responsive members confined for radial movements relative thereto and inwardly movable by centrifugal action, cam means reciprocally movable at one side of said responsive mechanism and normally standing in inward position relative thereto, said responsive members coacting with said cam means and when in the outward position of their radial movements permitting the cam means to stay in said normal position, and when in the inward position of their radial movements having coaction with a surface of the cam means to move the cam member a predetermined extent from normal position, and a control element in connection with and having predetermined movements imparted thereto by said cam means when moved from normal position.

4. In combination, a rotatable shaft, a movable control element, reciprocatory means having connection with said control element, said means normally standing in one position and operable when moved from such position to impart predetermined movements to said control element and having a cam face, and speed responsive mechanism driven by the shaft and including a centrifugally movable element which, when the shaft is running at a predetermined speed, permits said reciprocatory means to stand in normal position, and, when the shaft drops below such speed, automatically moves to coact with the cam face of said means to move it from normal position.

5. In combination, a rotatable shaft, a movable control element, a reciprocally movable cam member normally standing in one position and having connection with said control element to impart predetermined movement thereto when the cam member is moved from such position, said cam member having a cam face providing an annular raceway, a protuberant surface within said raceway, and an inclined surface intersecting said raceway and extending inwardly therefrom to said protuberant surface, speed responsive mechanism driven by the shaft and having an element which revolves therewith and is free to move radially a predetermined extent under centrifugal force, said element when at the limit of its outward radial movement being adapted to travel in the raceway of said cam member, and, when at the inner position of its radial movement, being adapted to traverse said inclined surface in rolling wedging coaction therewith to a point of engagement with the protuberant surface of said member and thereby impart actuating movement to said control element.

6. In combination, a movable control element normally standing in one position of its movement, a speed responsive mechanism for controlling the movements of said element, said mechanism comprising a rotatable member and one or more elements rotatable with said member and radially movable in one direction by centrifugal action and in the opposite direction by gravity action relative thereto, reciprocally movable means normally standing in one position and having connection and operable to impart predetermined movements to said control element when moved from such position, biasing means acting to hold said reciprocal means in normal position, said reciprocal means having an annular raceway with which said centrifugal elements engage when rotated at the outer limit of their centrifugal movements and which permits the reciprocal means to stand in normal position, said reciprocal means also having a cam surface with which the centrifugal elements have rolling wedging engagement to effect movement of said reciprocal means from normal position when a portion at least of the centrifugal elements are within the outer positions of their radial movements.

7. A speed responsive control, comprising a control element, a driven rotary element, a non-rotative member movable in a direction axial to the driven element and normally standing in one position of such movement, said member having connection with said control element and operable, when moved from normal position, to impart predetermined movements to the control element, said member also having a plane annular raceway and a cam portion within said way, and means rotatable with said driven element and movable radially outward thereof by centrifugal action, said means travelling in said plane raceway when in the outward position of its radial movement and coacting with said cam surface and effecting movement from normal position of said member when said means is in the inward position of its radial movement.

8. In combination, a control element, a speed responsive mechanism, said mechanism comprising a driven rotatable member and a ball member turning with said rotatable member and which is radially movable outward by centrifugal force, and a non-rotative reciprocally movable member normally standing in one position of its permissible movement and connected to said control element, said reciprocatory member being moved from normal position by said ball member when in the inward position of its radial movements, whereby to impart predetermined movement to said control element.

IVAN L. EASTMAN.